United States Patent [19]
Cantrell

[11] 4,090,197
[45] May 16, 1978

[54] MONOPULSE, FAN-BEAM, SEARCH-RADAR SYSTEM WITH IMPROVED HEIGHT AND AZIMUTH DETERMINATION

[75] Inventor: Ben H. Cantrell, Springfield, Va.

[73] Assignee: The United States of America as represented by the Secretary of the Navy, Washington, D.C.

[21] Appl. No.: 800,114

[22] Filed: May 24, 1977

[51] Int. Cl.² .................................................. G01S 9/22
[52] U.S. Cl. ................................................. 343/16 M
[58] Field of Search ..................................... 343/16 M

[56] References Cited
U.S. PATENT DOCUMENTS

| | | | |
|---|---|---|---|
| 3,064,253 | 11/1962 | Kirkpatrick | 343/16 M |
| 3,495,262 | 2/1970 | Paine | 343/16 M X |
| 3,757,326 | 9/1973 | White | 343/16 M X |
| 3,943,508 | 3/1976 | Boucher et al. | 343/16 M X |
| 4,005,421 | 1/1977 | Dax | 343/16 M |

Primary Examiner—T.H. Tubbesing
Attorney, Agent, or Firm—R. S. Sciascia; Philip Schneider; William C. Daubenspeck

[57] ABSTRACT

Multipath signals are eliminated at all but the lowest elevation angles allowing monopulse techniques to be used to determine target height and azimuth in a two-dimensional, fan-beam, search-radar system. A narrow-azimuth fan beam is oriented at an angle to the vertical plane and has its boresight centered approximately on the horizon so that a V-beam is formed by the direct beam and the portion of the direct beam reflected from the surface (i.e., the portion that is below the horizon). The reflected beam does not interfere with the direct beam except in a multipath region near the reflecting surface. Frequency diversity or a receive-only beam in the vertical plane may be used to determine if a target is in the multipath region.

8 Claims, 13 Drawing Figures

MONOPULSE, FAN-BEAM, SEARCH-RADAR SYSTEM WITH IMPROVED HEIGHT AND AZIMUTH DETERMINATION

BACKGROUND OF THE INVENTION

This invention relates in general to monopulse, fan-beam search radars and, more particularly, to a means of obtaining accurate azimuth and elevation measurements in such radars in the presence of surface-induced multipath returns and ship's roll and pitch.

The presence of land-or sea-surface-induced multipath returns complicates the search radar detection problem. Target height measurements without multipath returns can be achieved (at least in all but the lowest beam) with a three-dimensional pencil-beam radar, but such radars often have difficulty scanning through the search volume in short times. Because few pulses strike a target, multiple beams and large antennas are often required, resulting in expensive systems. The two-dimensional radar, having a fan beam which covers all elevations simultaneously, is usually less expensive, has a smaller antenna, and has more pulses on target than the three-dimensional radar, but its performance suffers considerably due to surface-induced multipath signals.

The receipt of multipath signals occurs when the energy reflected from a target is received both directly from the target and indirectly from a reflective surface such as the sea. As a result of the multipath signals, two targets (the actual target and an image target) are at the same range and within the radar beam at the same time. The return signal seen by the monopulse radar system is the sum of the direct signal and the reflected signal. As target elevation changes, the amplitude of the return signal fluctuates because the phase of the indirect signal varies relative to the phase of the direct signal. This circumstance causes target fading in a fan-beam radar.

Multipath returns may also cause poor angle measurements in elevation and azimuth. Since a monopulse radar normally obtains the elevation angle of a target by measuring the signal in two beam patterns (i.e., the elevation angle is related to the relative strength of the return signal in each beam), the multipath signals will cause severe errors in elevation angle measurements. In addition, when the radar platform experiences level and cross-level rotations, as is the case in shipboard systems that experience roll and pitch, the cross-level rotation and the multipath will interact to give severe errors in azimuth measurements.

SUMMARY OF THE INVENTION

The present invention provides a relatively inexpensive, two-dimensional, fan-beam search radar which is effected by multipath signals at only the lowest elevation angles. Since multipath interference is eliminated, target fading is reduced and conventional monopulse techniques are used to accurately determine target elevation angle and azimuth. The system is tolerant to level and cross-level motion (such as ship's roll and pitch) and therefore stabilization of the radar is unnecessary.

A search radar according to the present invention includes a conventional transmitter for producing pulses of electromagnetic energy and a conventional antenna for radiating the pulses and receiving reflected pulses from a target in a narrow-azimuth (approximately one degree in beamwidth) fan beam. The antenna is oriented so that the fan beam is directed at an angle between thirty and sixty degrees to the vertical plane and the boresight is centered approximately on the horizon. The energy reflected from the target is formed by the antenna into a sum signal, an elevation difference signal, and an azimuth difference signal, and these signals are fed to a monopulse receiver.

Due to the orientation of the beam, a V-beam is formed by the direct beam and the portion of the direct beam that is reflected from the surface (i.e., the portion of the direct beam that is below the horizon). The reflected beam does not interfere with the direct beam except in a multipath region near the reflecting surface. Since the reflected beam and the direct beam do not interfere, monopulse techniques may be used to determine the elevation angle and azimuth angle of the target. Frequency diversity or a receive-only beam in the vertical plane may be used to determine if a target is in the multipath region.

Other advantages and novel features of the invention will become apparent from the following detailed description of the invention when considered in conjunction with the accompanying drawings wherein:

DESCRIPTION OF THE PREFERRED EMBODIMENT

Figure 1:
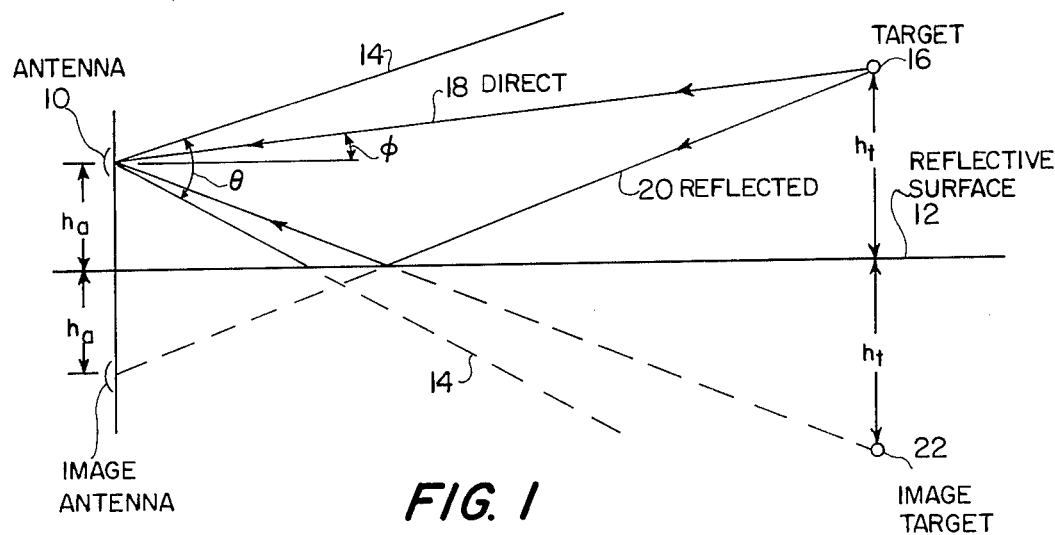
FIG. 1 is a pictorial representation of a fan-beam radar system illustrating the geometry of multipath signals.

Referring to FIG. 1, a typical fan-beam radar system periodically transmits pulses of the electromagnetic wave energy through an antenna 10 located at height, $h_a$, above a reflective land or sea surface 12. Each pulse of wave energy travels outwardly from the antenna 10 within the confines of a "fan-beam" 14 which has an elevation beamwidth specified in terms of an angle $\theta$, typically 10° – 30°. The fan beam 14, typically, has an azimuth beamwidth of 1° – 4° and is oriented with the thin portion of the beam orthogonal to the horizontal.

Energy striking a target 16 at an elevation angle $\Phi$ and height $h_t$ is reflected therefrom and is returned to the antenna 10. The return energy takes a direct path along the line-of-sight to the target, as is generally indicated at 18 in FIG. 1, and may also return to the antenna 10 by way of other paths such as a reflected path generally indicated at 20. The energy reflected from the target 16 along the path 20 would not ordinarily enter antenna 10, but upon striking the reflective surface 12 having a reflection coefficient ρ, the energy is reflected upwardly and is received by the antenna. The radar system thus receives multipath signals, i.e., at least two signals over different paths. This results in the appearance of two targets — the actual target 16 and an image target 22 — in the radar beam at approximately the same range.

At each point on the antenna aperture, the signal strength is the sum of the direct signal and the reflected signal, and the resultant returned signal is obtained by summing the signals across the aperture. The results of this simple model are well-known and the resultant returned signal S is given by $$S = A \{G(\Phi)e^{+j2\pi h_a \Phi/\lambda} + \rho G(-\Phi)e^{-j2\pi h_a \Phi/\lambda}\} \quad (1)$$

where $G(\Phi)$ = antenna pattern,
$\rho$ = reflection coefficient,
$h_a$ = antenna height,
$\Phi$ = elevation angle,
$\lambda$ = wavelength, and
$A$ = an amplitude factor related to the density of the received power across the antenna aperture.

Equation (1) shows that as the target elevation angle $\Phi$ changes, the amplitude of the returned signal fluctuates due to the direct and indirect signal interfering (the direct and reflected signal going in and out of phase).

Figure 2A:
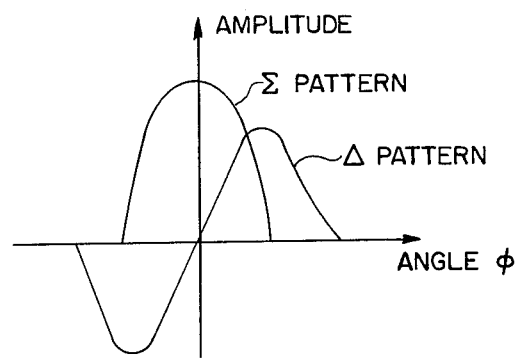
FIGS. 2a – 2c illustrate angle determination with monopulse techniques and the effects of multipath signals on such determinations.

A simple monopulse radar computes the elevation angle $\Phi$ by measuring the return from two beam patterns called the sum ($\Sigma$) pattern and difference ($\Delta$) pattern, as shown in FIG. 2a. A radar pointed toward (centered on) the horizon would yield an elevation measurement using equation (1) in the form $$\frac{S_\Delta}{S_\Sigma} = \frac{G_\Delta(\Phi)}{G_\Sigma(\Phi)} \cdot \frac{e^{+j2\pi h_a \Phi/\lambda} - \rho e^{-j2\pi h_a \Phi/\lambda}}{e^{+j2\pi h_a \Phi/\lambda} + \rho e^{-j2\pi h_a \Phi/\lambda}} \quad (2)$$

Figure 2C:
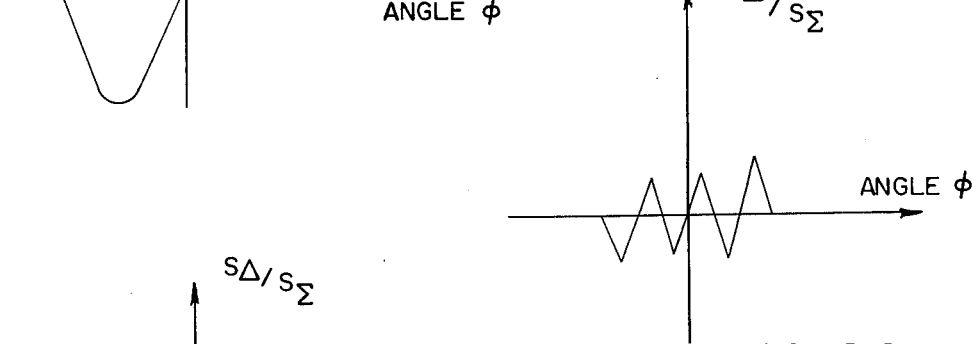
Figure 2B:
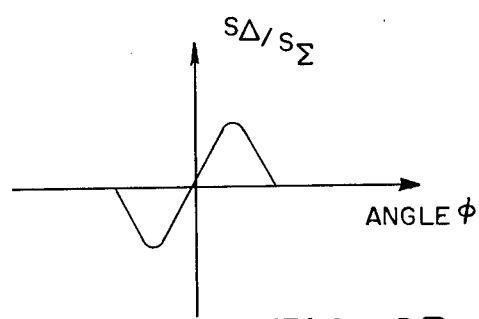

If the reflection coefficient ρ is zero (i.e., only the direct signal is present), the target elevation and the ratio $S_\Delta/S_\Sigma$ are related as shown in FIG. 2b, and the elevation angle may be obtained by solving equation (2). However, if ρ is not zero, the ratio $S_\Delta/S_{93}$ will have larger variations with only small changes in $\Phi$ as shown in FIG. 2c. The ratio $S_\Delta/S_\Sigma$ sweeps rapidly over a large range of values in a manner that cannot be calibrated because of its multivalued nature and because the coefficient of reflection varies with the reflecting surface. Thus, when multipath exists, the elevation angle measurements obtained in fan-beam radars by monopulse techniques are quite poor and the return signal suffers from fading.

Figure 3:
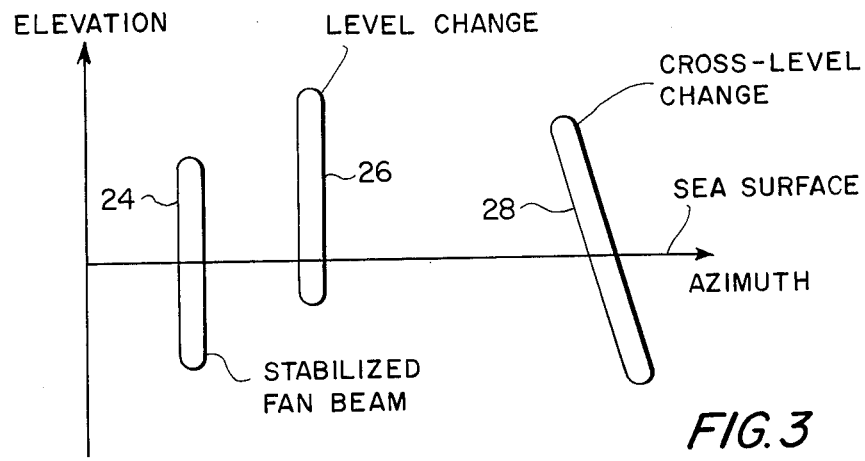
FIG. 3 illustrates level and cross-level changes in a fan-beam radar.
Figure 4A:
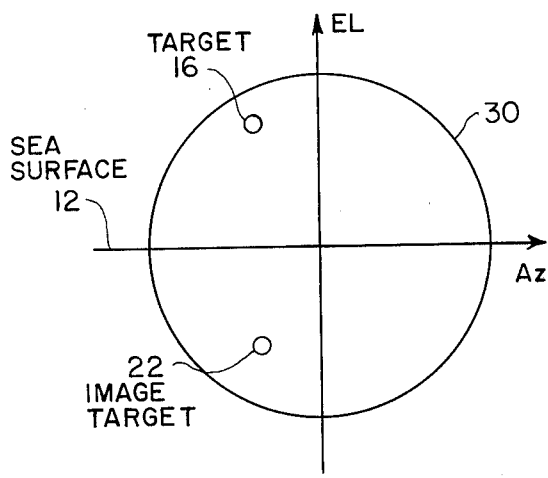
FIGS. 4a and 4b illustrate the effect of level and cross-level changes if multipath signals are present.
Figure 4B:
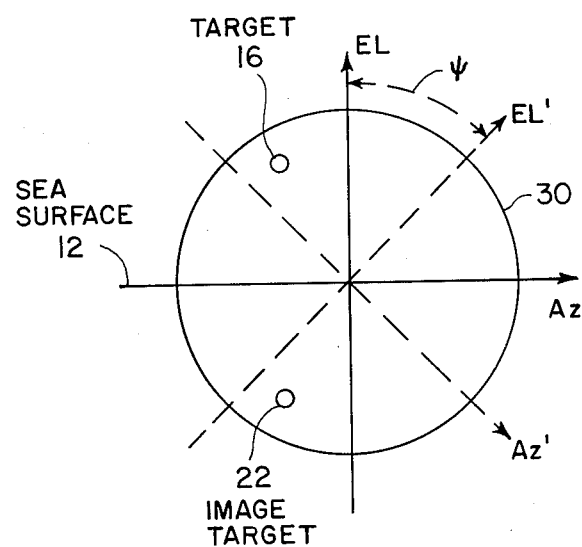

When the fan-beam radar is located on a ship, the ship's motion (i.e., pitch and roll) further complicates the azimuth and elevation angle determinations by monopulse techniques. Roll and pitch will, in general, rotate the beam in both level and cross level. The 3-dB contours of an antenna pattern, as seen looking in the beam propagation direction from the antenna position, are illustrated for a stabilized fan-beam, a fan-beam with a level change, and a fan-beam with a cross-level change at 24, 26 and 28, respectively, in FIG. 3. The level rotation basically changes the elevation pointing direction of the beam, and the usual requirement imposed is simply to keep power propagating in the desired direction. The effects of cross-level change are more complicated and are illustrated in FIGS. 4a and 4b. FIG. 4a shows the 3-dB contour 30 of a pencil beam centered on the horizon with a target 16 above the horizon within the beam. If the reflecting surface were not present and a free space environment existed, the target elevation and azimuth angle could be measured by normal monopulse techniques and, if the radar were rotated in cross-level by an angle Ψ (as shown in FIG. 4b) the measurements in the new coordinates, EL' and AZ', could be rotated to obtain actual elevation and azimuth angles. If multipath exists, and there is no cross-level rotation (Ψ = 0° as in FIG. 4a), the azimuth can be measured accurately. On the other hand, elevation cannot be measured accurately due to the multipath changing the distribution of power across the aperture in the vertical direction. However when cross-level rotations exist, the vertical distribution of power couples into both the EL' and AZ' directions causing large errors in both elevation and azimuth angles.

Figure 5:
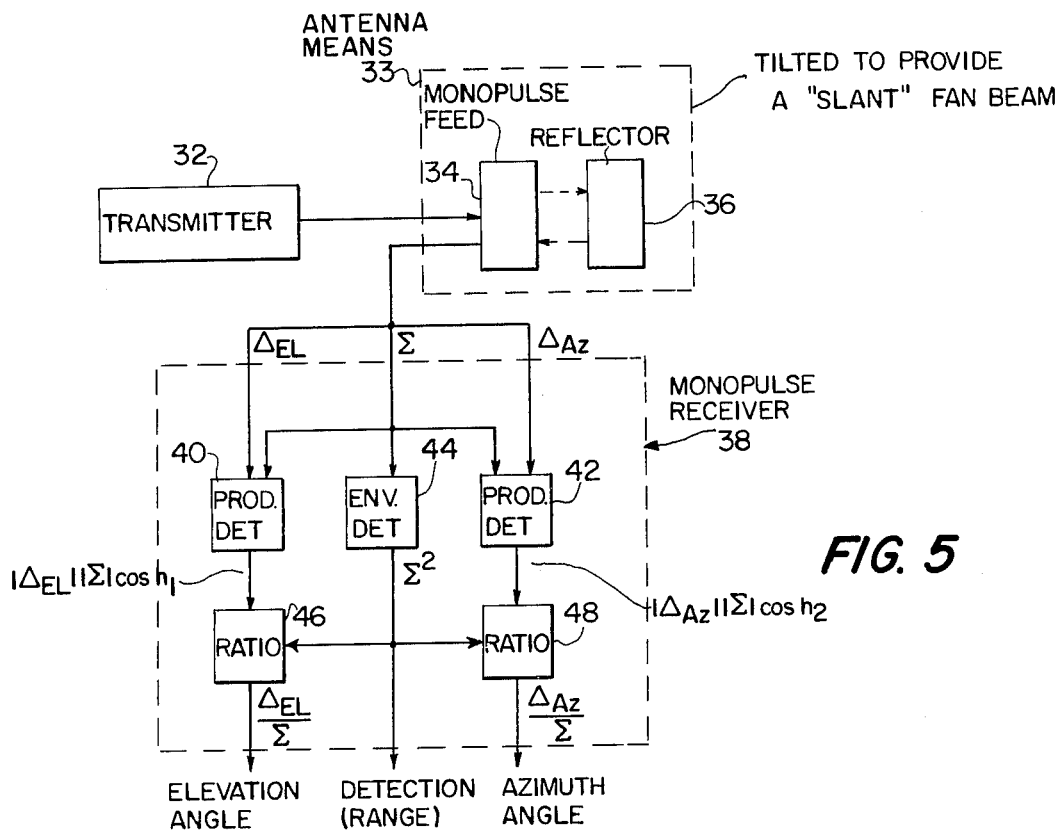
FIG. 5 is a block diagram of a monopulse, fan-beam radar system according to the present invention.

Referring now to FIG. 5, there is shown a block diagram of a monopulse, fan-beam, search radar system according to the present invention that does not suffer from multipath signal degradation except at very low elevation angles (below approximately 1 to 1¼°). A conventional radar transmitter 32 feeds pulses of wave energy to an antenna means 33 which includes a conventional monopulse feed 34 coupled to a conventional reflector 36 which radiates the pulses in the form of a fan beam of 10° – 30° in elevation beamwidth of approximately 1° is preferred. The design and operation of the monopulse feed 34 and reflector 36 are well known. In general, attention is directed to "Radar Handbook", M. I. Skolnik (Editor), McGraw-Hill, 1970, Chapter 10 (Reflectors and Lenses) and Chapter 21.4 (Monopulse and Monopulse Feeds), for a thorough discussion of these devices. The elevation and azimuth beamwidth are, of course, a function of the design of monopulse feed 34 and reflector 36.

The reflector 36 and monopulse feed 34 are oriented so that the center line of the fan beam radiating therefrom is parallel to (or centered on) the sea surface (horizon) and a central plane 37 (see FIG. 6) passing medianly through the beam 50 (as seen looking forward from the antenna position) is tilted from the vertical line, EL, at a predetermined angle of between 30° and 60° with an angle of 45° being a preferred orientation. (The above described fan beam is equivalently described herein as being oriented at angle (30° to 60°) to the vertical plane and having its boresight centered on the horizon.) This is similar to a "slant beam" in a conventional V-beam radar. It should be noted that the required fan beam can be implemented by phased-array techniques in which the antenna means 33 is not itself rotated with respect to the vertical plane.

The energy radiated from the antenna reflector 36 upon striking a target is reflected therefrom and is returned to the antenna reflector 36 and to monopulse feed 34 which forms the reflected signal into a sum signal $\Sigma$, an elevation difference signal $\Delta_{EL}$, and an azimuth difference signal $\Delta_{AZ}$ in the conventional manner.

The sum signal $\Sigma$, the elevation difference signal $\Delta_{EL}$, and the azimuth difference signal $\Delta_{AZ}$ are then fed to a conventional monopulse receiver 38 which includes dot product detectors 40 and 42, and an envelope detector 44. In general, a thorough description of monopulse receivers may be found in Skolnik, supra, at Chapter 21.4. Dot product detector 40 receives the sum signal $\Sigma$ and the elevation difference signal $\Delta_{EL}$ and provides an elevation-error signal proportional to their dot product (i.e., $|\Delta_{EL}| |\Sigma| \cos \eta_1$, where $\eta_1$ is the phase difference between the elevation difference-channel signals and the sum-channel signals, generally 0° or 180°). Similarly the dot-product detector 42 receives the sum signal $\Sigma$ and the azimuth difference signal $\Delta_{AZ}$ and provides an azimuth-error signal proportional to their dot product (i.e., $|\Delta_{AZ}| |\Sigma| \cos \eta_2$, where $\eta_2$ is the phase difference between azimuth difference-channel signals and the sum-channel signals). The sum signal in the dot-product detectors furnishes a phase reference to determine the position of the target relative to boresight (above or below boresight in the case of detector 40 and to the left or right of boresight in the case of detector 42. Envelope detector 44 provides an output voltage proportional to the square of its input, the sum signal $\Sigma$.

The ratios of the $\Delta_{EL}$ voltage and the $\Delta_{AZ}$ voltage to $\Sigma$ voltage are taken at 46 and 48, respectively, to provide signals that are proportional to the target elevation angle and azimuth angle, respectively. These ratios, $\Delta EL/\Sigma$ and $\Delta AZ/\Sigma$, and the output of the envelope detector 44 provide the angle and range information for further processing which is conducted in a conventional manner.

Figure 6:
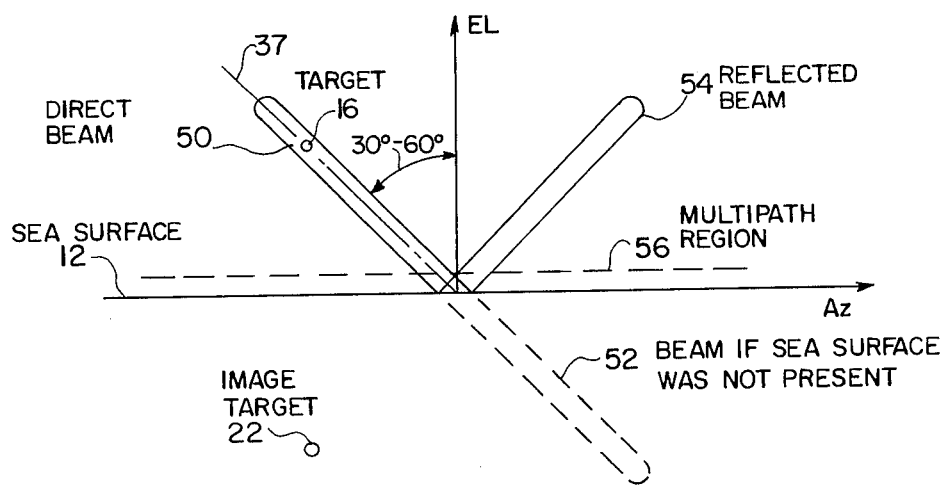
FIG. 6 illustrates the elimination of multipath signals by the present invention.

With regard to the operation of radar system of the present invention, and in particular to the elimination of multipath signals, reference is made to FIG. 6. The 3-dB contour of the fan beam contemplated by the present invention is shown at 50 with a target 16 located within the beam. The portion of the beam which would be below the horizon (as shown by dashed line 52) is reflected by the surface 12 so that a V is formed by the direct beam and the portion of the direct beam that is reflected from the surface. As can be seen from the figure, the reflected beam 54 does not interfere with the direct beam 50 except near the surface as indicated by multipath region 56.

Any target in the direct beam above the multipath region 56 can be monopulsed to find the azimuth and elevation angles (no multipath effects are present because the image target 22 is not in the beam), and then these coordinates can be rotated to find the true position. In addition there is no fading since interfering sea reflections are absent.

If the elevation difference pattern has its null at the horizon (as would be the case in FIG. 2a), any negative elevation angle at the output of the monopulse receiver 38 corresponds to the target being in the reflected beam and a positive angle corresponds to a target in the direct beam. The return from the target in the reflected beam may be useful for up-dating a track. However, since the signal strength depends on the reflection coefficient of the surface and this varies greatly, the returns from the reflected beam are not reliable and in most cases may be discarded.

The operation of the present invention should not be confused with the operation of a conventional V-beam radar in which, typically, a vertical fan beam and a slant fan beam are rotated at a constant rate about a vertical axis. When a target is hit by radiations from both beams, the angle between the hits (which can be determined by a time measurement) is a function of the elevation angle of the target. Monopulse techniques are not used in the V-beam radar system.

Figure 7A:
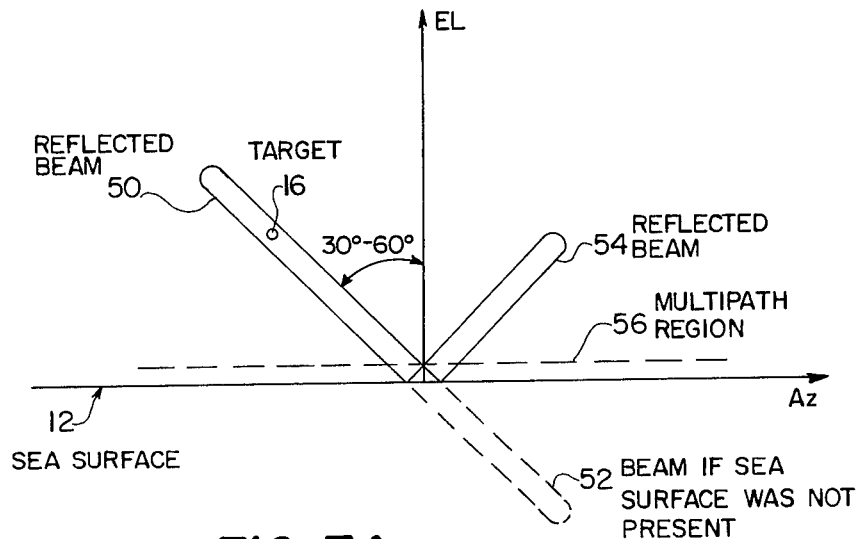
FIGS. 7a and 7b illustrate the effect of level and cross-level changes on a radar according to the present invention.
Figure 7B:
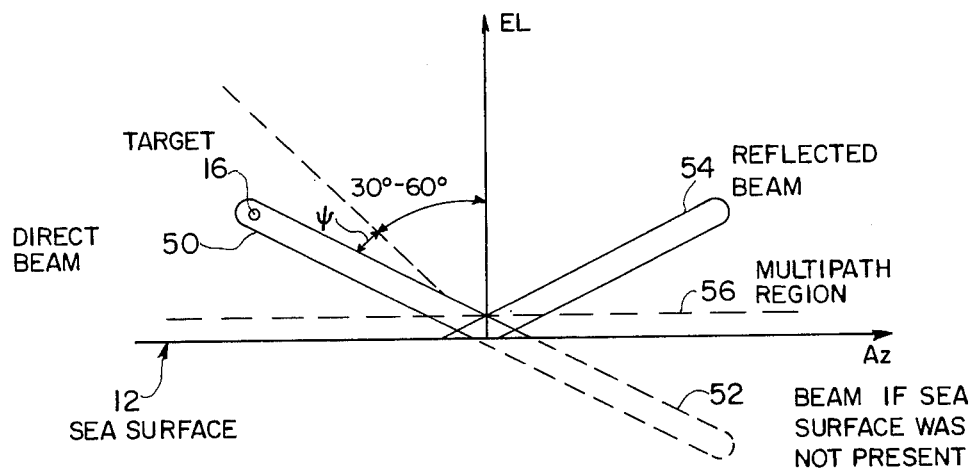

The effect of level and cross-level changes on the present system is shown in FIG. 7. It will be noted that the system of the present invention is tolerant to roll and pitch. As can be seen in FIG. 7a, a level change varies the division of the total transmitted power (and received power) between the direct beam 50 and the indirect beam 54. With the broad fan beam (broad in elevation beamwidth) of the present system, the direct beam 50 will retain an elevation beamwidth sufficient to cover the desired elevation angles even though the system experiences a level change. A cross-level change, as indicated generally by angle $\Psi$ in FIG. 7b, varies the angle of the direct beam 50 with respect to the vertical plane EL. It can be seen that the system can experience substantial cross-level change without significantly changing the size of the multipath region 56 or reducing elevation-angle coverage. Because of this tolerance to level and cross-level change, the antenna of the present system does not have to be stabilized for shipboard operations.

Figure 8:
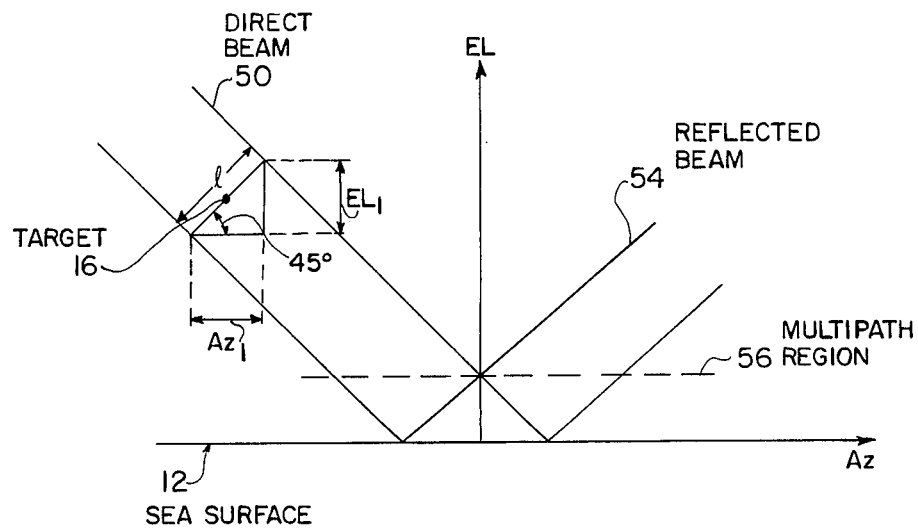
FIG. 8 illustrates the determination of target position if monopulse techniques are used to find the target elevation angle in the beam but are not used to find target azimuth.

It is further noted that the present invention may be practiced by using monopulse techniques in the determination of target elevation angle within the beam but without using monopulse techniques to determine the target azimuth angle within the beam; that is, the formation of an azimuth difference signal $\Delta_{AZ}$ in monopulse feed 34 and the azimuth difference channel of monopulse receiver 38 may be omitted from the system of FIG. 5. Of course, this will reduce the accuracy of the target-position determination in both elevation angle and azimuth angle. Referring to FIG. 8, the position of a target 16 in the direct beam 50 may be determined to be along a line $l$ by nonpulsing in elevation. However, it can be seen that there is an uncertainty of $EL_1$ and $AZ_1$ in the target position in the EL and AZ directions, respectively. For example, if the azimuth beamwidth is 1 degree and the direct beam 50 is oriented at an angle of 45° to the vertical plane, the actual target azimuth angle and elevation angle may be determined to within 0.707° (i.e., $EL_1 = l \sin 45°$, $AZ_1 = l \cos 45°$). Thus a simpler, less-expensive system having the multipath-signal-elimination characteristics may be obtained, but at a loss of accuracy in the determination of target position.

Figure 9:
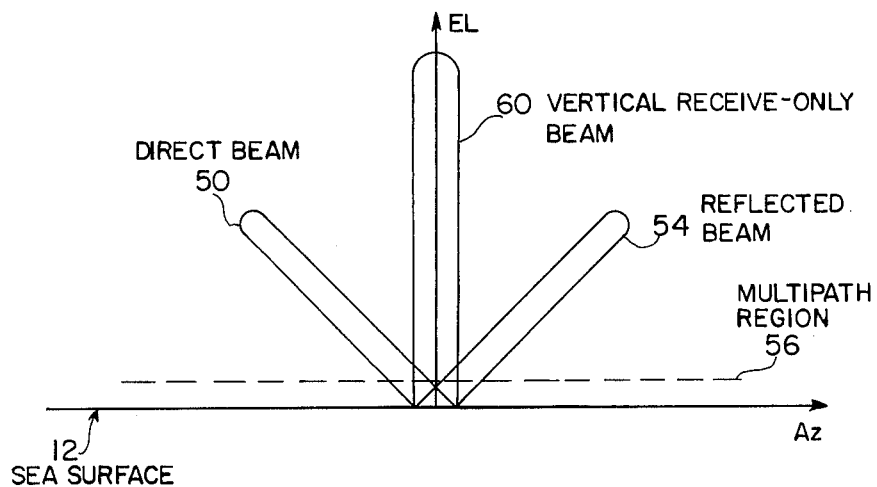
FIG. 9 illustrates a technique to alleviate the effect of multipath signals at low elevation angles.

Referring now to FIG. 9, any target 16 in the region 56 near the sea surface will experience severe fading due to multipath. This can be alleviated by using well-known frequency diversity techniques. The angle measurements will be grossly in error and will change dramatically from frequency to frequency and from scan to scan of the radar. The target can be located in this multipath region by noting this condition. An alternate means of showing that the target is in the multipath region is to introduce a receive-only beam in the vertical plane as shown at 60. If the target is detected in both the tilted beam and the vertical beam simultaneously, the target can be said to be in the multipath region.

It can be seen that the present invention provides a fan-beam, monopulse search radar system that eliminates multipath signals in all but the lowest elevation angles. The system provides accurate target height and azimuth information and is tolerant to ship's roll and pitch. A radar according to the present invention is relatively inexpensive to implement and utilizes conventional components. For example, an SPG-55 monopulse tracking radar may be converted to a search radar according to the present invention by changing the reflector to provide a narrow-azimuth fan beam and tilting the antenna to orient the beam at 30° – 60° with respect to the vertical plane.

Obviously many modifications and variations of the present invention are possible in light of the above teachings. It is therefore to be understood that within the scope of the appended claims, the invention may be practiced otherwise than as described.

What is claimed and desired to be secured by Letters Patent of the U.S. is:

1. A monopulse, fan beam, search-radar system in which multipath signals are received only when a target is in a multipath region located at low elevation angles, which comprises:

transmitter means for producing pulses of electromagnetic wave energy;

antenna means for radiating said pulses and receiving target return signals, said antenna means forming a narrow-azimuth fan beam whose center line is aimed at the horizon and whose central plane is tilted at an angle of from 30° to 60° from the vertical plane, said antenna means including a sum receiving channel and an elevation-difference receiving channel for providing a sum signal and an elevation difference signal, respectively, from the target return signals; and monopulse-receiver means coupled to said antenna means for receiving said sum signals and said elevation-difference signals, said monopulse-receiver means providing an elevation angle signal and a range signal corresponding to the elevation angle and range of the target.

2. The radar system as recited in claim 1, wherein said antenna means comprises:

a reflector for radiating the pulses produced by said transmitter means and receiving target return signals in a narrow-azimuth fan beam whose center line is aimed at the horizon and whose central plane is tilted at an angle of from 30 to 60 degrees from the vertical plane; and a monopulse feed for coupling said pulses from said transmitter means to said reflector, said monopulse feed forming the target return signals received by said reflector into a sum signal and an elevation-difference signal.

3. The radar system of claim 1, wherein said antenna means further comprises:

an azimuth-difference receiving channel for producing an azimuth-difference signal from the target return signals; and wherein said monopulse-receiver means is further coupled to said antenna means for receiving said azimuth-difference signal, said monopulse-receiver means providing an azimuth-angle signal corresponding to the azimuth angle of the target.

4. The radar system as recited in claim 1, wherein said antenna means comprises:

a reflector for radiating the pulses produced by said transmitter means and receiving target return signals in a narrow-azimuth fan beam whose center line is aimed at the horizon and whose central plane is tilted at an angle of from 30° to 60° from the vertical plane; and a monopulse feed for coupling said pulses from said transmitter means to said reflector, said monopulse feed forming the target return signals received by said reflector into a sum signal, an elevation-difference signal, and an azimuth-difference signal.

5. The radar system of claim 1, wherein the central plane of said fan beam is tilted at an angle of approximately 45° to the vertical plane and said fan beam has an azimuth beamwidth of approximately one degree.

6. The radar system of claim 3, wherein the central plane of said fan beam is tilted at an angle of approximately 45° to the vertical plane and said fan beam has an azimuth beamwidth of approximately one degree.

7. In a monopulse search radar having a transmitter for producing pulses of electromagnetic energy and monopulse-receiver means for producing signals providing the elevation angle, azimuth angle, and range of a detected target, the improvement comprising:

antenna means for radiating said pulses and receiving target return signals, said antenna means forming a narrow-azimuth fan beam whose center line is aimed at the horizon and whose central plane is tilted at an angle of from 30° to 60° from the vertical plane, said antenna means including a sum receiving channel and an elevation-difference receiving channel for providing a sum signal and an elevation-difference signal, respectively, from the target return signals, whereby multipath return signals are minimized.

8. In the improved monopulse search radar as receited in claim 7, said antenna means further comprising an azimuth-difference receiving channel for providing an azimuth-difference signal from the target return signals.

* * * * *